(12) United States Patent
Guerriero et al.

(10) Patent No.: US 10,969,859 B2
(45) Date of Patent: Apr. 6, 2021

(54) HUMAN-COMPUTER INTERFACE COMPRISING A TOKEN

(71) Applicant: LUXEMBOURG INSTITUTE OF SCIENCE AND TECHNOLOGY (LIST), Esch-sur-Alzette (LU)

(72) Inventors: Annie Guerriero, Arlon (BE); Valérie Maquil, Luxembourg (LU)

(73) Assignee: LUXEMBOURG INSTITUTE OF SCIENCE AND TECHNOLOGY (LIST), Luxembourg (LU)

(*) Notice: Subject to any disclaimer, the term of this patent is extended or adjusted under 35 U.S.C. 154(b) by 0 days.

(21) Appl. No.: 16/644,330

(22) PCT Filed: Aug. 29, 2018

(86) PCT No.: PCT/EP2018/073184
§ 371 (c)(1),
(2) Date: Mar. 4, 2020

(87) PCT Pub. No.: WO2019/048298
PCT Pub. Date: Mar. 14, 2019

(65) Prior Publication Data
US 2020/0209955 A1 Jul. 2, 2020

(30) Foreign Application Priority Data
Sep. 5, 2017 (LU) .................................. 100389

(51) Int. Cl.
*G06F 3/01* (2006.01)
*G06F 3/042* (2006.01)

(52) U.S. Cl.
CPC .............. *G06F 3/011* (2013.01); *G06F 3/017* (2013.01); *G06F 3/0425* (2013.01)

(58) Field of Classification Search
CPC ........ G06F 3/011; G06F 3/017; G06F 3/0346; G06F 3/0354; G06F 3/0425
See application file for complete search history.

(56) References Cited

U.S. PATENT DOCUMENTS

2011/0294426 A1* 12/2011 Matsubara ........... H04N 21/478
455/41.2

FOREIGN PATENT DOCUMENTS

| EP | 1615109 A2 | 1/2006 |
|----|------------|--------|
| EP | 2171863 A2 | 4/2010 |

(Continued)

OTHER PUBLICATIONS

International Search Report for corresponding PCT/EP2018/073184 dated Sep. 18, 2018.
(Continued)

*Primary Examiner* — Nelson M Rosario
(74) *Attorney, Agent, or Firm* — Sandberg Phoenix and von Gontard

(57) ABSTRACT

A system comprising a display provided with zones, a token, a proximity sensor for detecting the proximity of a token to one zone and a processor to register in a memory an association upon the detection of the proximity of the token to the zone. The association is logged as a set of data comprising the data of which a representation is made on the zone in the proximity of which the token has been brought. The processor is programmed to update a log file with the logged association. The processor performs an operation in accordance with the content of the log file.

19 Claims, 3 Drawing Sheets

(56) References Cited

FOREIGN PATENT DOCUMENTS

| | | |
|---|---|---|
| EP | 2960769 A1 | 12/2015 |
| JP | 2001265523 A | 9/2001 |
| WO | 2013032222 A1 | 3/2013 |

OTHER PUBLICATIONS

Written Opinion for corresponding PCT/EP2018/073184 dated Sep. 18, 2018.

* cited by examiner

HUMAN-COMPUTER INTERFACE COMPRISING A TOKEN

The present invention is the US national stage under 35 U.S.C. § 371 of International Application No. PCT/EP2018/073184, which was filed on Aug. 29, 2018, and which claims the priority of application LU 100389 filed on Sep. 5, 2017, the content of which (text, drawings and claims) are incorporated here by reference in its entirety.

FIELD

The invention is directed to the field of human-computer interfaces. The invention more particularly relates to the field of Tangible User Interfaces, TUI.

BACKGROUND

A human-computer-interface that is intuitive can be used by people without skills or training or people reticent to reading an instruction manual. Touch-based user interfaces contains multiple examples, such as pinch-to-zoom, which can be mastered by very young children.

Human beings are used to manipulating physical objects. The field of Tangible User Interface, TUI, aims at materializing part of the human-computer interface and relies on the use of intuitive manipulation of physical objects.

When using a mouse, even a basic operation like a copy-paste requires the user to carry out several successive steps, such as selecting the data to be copied, instructing the copy action, selecting the destination and instructing the paste action.

To enhance the speed of repetitive actions, keyboard shortcuts or macros can be used. But these require a learning process and are therefore not adapted to be used by unskilled or untrained personal.

Prior art patent document EP 2 171 863 gives an example of a gesture based human-computer interface. Countless video games also employ these kinds of human-computer-interface.

The document WO 2013/032222 discloses the transfer of information between two smartphones via a touchscreen. By laying down a smartphone on a (bigger) touchscreen, an image can be transferred to the touchscreen. The possibilities in terms of functions available in this system are rather limited.

SUMMARY OF INVENTION

The invention has for technical problem to provide an alternative tangible human-computer interface which is simpler to use and offers more flexibility in terms of possible functionalities.

The invention has many possible fields of applications, among which building information modelling (BIM), architecture, industry, logistic, agriculture, leisure, interactive or educative situations, construction, health, urban planning, etc.

The invention is directed to a system comprising: at least one display provided with at least one zone; at least one token, in various instances, provided with an ID; a proximity sensor for detecting the proximity of a token to one of the zones of the display and, in various instances, also for detecting the ID of the token; a memory; a processor programmed to register in the memory an association upon the detection of the proximity of the token to the zone, the association being logged as a set of data comprising the data of which a representation is made on the zone of the display in the proximity of which the token has been brought at the moment of the detection and, in various instances, also the ID of the token; the processor being programmed to update a log file with the logged association; the processor being programmed to perform an operation, wherein the operation performed depends on the content of the log file.

According to an exemplary embodiment, the operation depends further on the nature/metadata of the displayed data.

According to an exemplary embodiment, the operation depends further on a setting or personalization procedure.

According to an exemplary embodiment, the operation depends further on a gesture made by the user hand holding the token, the gesture being detected by the proximity sensor or a further gesture sensor.

According to an exemplary embodiment, the operation depends further on the context, i.e. geographical position and/or time/date and/or situational context during which the association occurs.

According to an exemplary embodiment, the token is allocated to a user and the operation depends further on authorizations given to the user. Some user may be authorized to accomplish every possible operation, whereas some other users may be authorized to only accomplish one or a few of the possible operations. The authorizations can be defined in an initial setting phase or can be dynamically evolving based on the content of the log file.

According to an exemplary embodiment, the system further comprises a device provided with at least one zone; a second proximity sensor for detecting the proximity of a token to one of the zones of the device and for, in various instances, also detecting the ID of the token; the processor being programmed to register in the memory a second association upon the detection of the proximity of the token to a zone of the device; the processor being programmed to update the log file with the second association. The second device can comprise its own processor to register the association and update the log file.

According to an exemplary embodiment, the second association occurs before the first association.

According to an exemplary embodiment, the device is a second display.

According to an exemplary embodiment, the device is a device of the Internet of Things.

According to an exemplary embodiment, the display and/or the second display is a monitor or a touchscreen, and, in various instances, the proximity sensor is/are integrated into the display(s).

According to an exemplary embodiment, the display and/or the second display is/are a physical display such as written information on a support, and, in various instances, the proximity sensor comprises one or more camera(s) connected to the processor.

According to an exemplary embodiment, the display and/or the second display is/are tangible tables.

According to an exemplary embodiment, the operation performed is part or all of a copy-paste operation, or part or all of a synchronisation operation of the data displayed.

According to an exemplary embodiment, the operation performed consists in copying the displayed data and pasting the data, potentially in altered form, in/on the device.

According to an exemplary embodiment, the operation performed is a locking of the displayed data.

According to an exemplary embodiment, the log file is dedicated to one token and/or to one zone of the display and/or to one display and/or to one displayed data.

According to an exemplary embodiment, the log file further comprises the indication of date/time and/or geographical localisation of when/where the association occurred. The geographical localisation can be the coordinates (X, Y, Z) with respect to a spatial origin of the center of gravity of the zone, of the middle point between the center of gravity of the token and the center of gravity of the zone at the moment of the detection of the proximity, or of any other point in relation with the position of the token and/or of the zone at the moment of the association.

According to an exemplary embodiment, the proximity to a zone of the display is detected when the proximity sensor detects that the distance between the token and a zone of the display is below a pre-determined threshold.

According to an exemplary embodiment, the token can be inserted in a recess of the device.

Alternatively or in combination with the previously described embodiments, the system of the invention comprises at least one display provided with at least one zone; at least one token provided, in various instances, with an ID; a proximity sensor for detecting the proximity of a token to one of the zones of the display and also, in various instances, for detecting the ID of the token; identification means for identifying a representation of data displayed in each zone of the display and their corresponding metadata; a memory; a processor programmed to register in the memory an association upon the detection of the proximity of the token to the zone, the association being logged as a set of data comprising the ID of the token, if any, the data of which a representation is made at the moment of the detection on the zone of the display in the proximity of which the token has been brought, and their corresponding metadata.

The invention is particularly interesting in that it can be used by anyone without training. It is furthermore very flexible since it can be used in a multi-display and/or multi-device computer system, where the displays are distanced from each other (and not contiguously arranged on a desk). It is also appropriate to establish a communication between tangible or physical (non-electronic) systems and a computer. It is also advantageous for carrying out tasks that may be interrupted, namely a copy-paste where several minutes or hours pass between the step of "copy" and the step of "paste" and where the content of the display may change between those steps.

Definitions

The display according to the invention can be a computer monitor, a TV set, a touchscreen or a physical display (paperboard, whiteboard, blackboard, post-it, book . . . ). The display can be flat but can also have various three-dimensional shapes or forms.

The zone of the display is part or the whole of the display. It can be one or more pixels, or any other suitable subdivision of the display. Each zone can be predetermined for a given display. The zones can also be dynamically reallocated depending on the content that is actually displayed at a given moment in time. In other words a particular sub-division of the display forming a zone at one instant in time can form two zones or can be divided to partially form two or more other zones at another instant in time. These changes can be operated by the user or by the system itself in response to operations carried out by the processor optionally as a consequence of an association as described in the main embodiment of the invention. The shape and size of a zone can also be dictated by the content that is displayed and can evolve accordingly, if the content evolves. This can occur for instance when a zoom-in is operated by the user or when the content displayed is not a fixed image and varies in time (video, gif, etc.). The zones of a display can be contiguous or spaced apart and can have random shapes. The zone can be void of graphical representation, in which case the displayed data is the desktop/background of the display. In other words, it can seem empty but is in fact not void of displayed data. The content presented on the display can be affected by other programs or other users independently from the zones or the manipulation of the token.

The displayed data in a zone is the visual representation of data. For instance, displayed data can be an icon which represent a file. Displayed data can be text, image, URL, etc. Although this is not strictly correct, the present patent application will use the term displayed data to mean the data itself that is represented on the display. Therefore, for instance, when a text editor icon is displayed to represent a file in a browser, the displayed data will in fact be considered to be the file itself. In other words, it is assumed that the displayed data corresponds to the stored data of which a representation is made.

The token is a simple object which can contain an identification (ID) through which it can be identified. The ID can be unique to a token in a particular system or can be common to two or more tokens. The ID can be of various kind of technologies and has the property of being detectable and identifiable. Therefore, the ID can be an RFID code, bar code, QR-code. The ID can also be the particular shape, form, color or texture of the token. The ID can be based on the physical property of the object, such as its response to particular electromagnetic field. The ID can also be a combination of all those. Although the token aims at being a simple object, it can be provided with a display and a button to interact with a menu when the choice is offered between more than one operation to be carried out by the processor (further details below). The token can be provided with safety measures such as fingerprint reader to ensure that only its intended authorized user can perform operations with it.

Alternatively, the token does not contain any of these and is only a simple physical object. It does not need to carry any piece of information and does not need to be fed in electric power.

The token is in most cases a small object that can be held in hand, in a pocket or attached to a key ring. It can be part of a car key fob. It can be attached to the human body (ring, watch, wearables, smartphone, etc.) or even be integrated in the human body (subcutaneous chip, pacemaker, intrabody implant, etc.).

The token can be switched between an inactive mode where no interaction with a zone of the display can be made and an active mode where an interaction with a zone generates an association.

The token may have a display that displays the displayed data that has been associated with the token, i.e. the data displayed on the zone of the display that has been approached by the token. Such a token does not necessarily contain the displayed data, but may only contain a display which shows a graphic representation of the displayed data. For instance, if the displayed data is a file in the browser, the display of the token can show the icon or the name of the file. The file itself is, in various instances, is not stored in the token. That way, even if the token is stolen, no breach of security can occur.

Alternatively or complementarily, the token can be provided with a memory and a sensor, such as QR-code sensor, RFID sensor . . . and wireless communication means such that when it is associated with a zone, the processor performs an operation based on the data in the memory of the token.

The token can also be provided with vibration means, acoustic means (buzzer) or optical means (LED) to give a haptic feedback to the user confirming that the association has been recorded.

The proximity sensor can be of various kinds. It can be a camera or a network of camera, RFID sensor, bar-code or QR-code reader. The proximity sensor can be positioned such that it can assess the distance between the token and at least one zone of the display. There can be one proximity sensor per zone, or a sensor can detect the proximity of the token to more than one zone. The proximity sensor can be made of two sensors, one identifying the ID of the token, if any, and one assessing whether the criteria of proximity between the token and the zone is reached. The proximity sensor can be integrated into the display, can be integrated into the token, or can be external to both.

The criterion to trigger an association can be based on the distance between the token and the zone. If the distance falls below a pre-determined threshold, a proximity is detected. This computation of the distance and its evaluation compared to a threshold can be made by a processor that is different from the processor of the main embodiment of the invention. Alternatively, the proximity can encompass the direct contact. In yet another embodiment, the direct contact can also be excluded: if a contact is detected within a short time period after the proximity is detected, no association is recorded. This allows the user to use both functionalities of a touchscreen: the functionality with a token offered by the present invention but also the functionality of a regular touchscreen.

The proximity sensor can be sensors that are not exclusively dedicated to the system of the invention, like for instance a network of CCTV video cameras.

The proximity can also be detected by any other means. For instance, the token can emit an electromagnetic field (Bluetooth, Z wave, light source, etc.). A proximity is therefore detected when a sensor detects that the intensity of the field reaches a threshold in a zone of the display. Vice versa, the emission can be done by the zones of the display and the token can be equipped with the proximity sensor which triggers the occurrence of an association. The sound or ultra-sound emitted by the contact between the token and the zone can also be a way to detect the proximity.

An association is an event that happens when the proximity sensor detects that the criterion of proximity is reached for a token with respect to a zone. The term association is to be understood as a pairing, matching or linkage of pieces of information.

The association event triggers the storage of a piece of information. The piece of information can contain the ID of the token, if any, and the displayed data.

This piece of information is stored in a log file. The log file is a file that gathers the information of successive associations. The log file can be dedicated to one token, and/or to one zone of the display, and/or to one display and/or to one displayed data and/or to one system.

Once the log file is updated with the association information, the processor seeks to perform an operation. Based on the content of the log file, the processor will choose to perform none, one or more of many pre-determined operations.

The log file can be in restricted access or freely available in the form of a text file. It can contain readable instructions that can allow to edit it, by modifying or cancelling a registered association.

The wording "log file" is to be understood widely. It can be a database of any kind (including not centralized NoSQL databases) or a history of the associations. The history can be purged at the request of the user or automatically as pre-set in the system.

The processor will perform an algorithm to determine which operation, if any, it has to carry out.

The algorithm can be self-evolving, can be based on artificial neurons and/or can learn from the behaviour of the system.

The algorithm can be pre-defined by the user or can be set as default and evolve dynamically after each association. It can therefore adapt to the practice of the user.

The operation that is performed by the processor can depend for instance on the last association: the ID of the token, if any, the zone of the display, the displayed data and/or its metadata. The operation can also depend on information in the log file, such as the previous association for the given token, the previous association of the given zone, the previous association of the displayed data or of a displayed data which is similar (i.e. at least one of the metadata in common). The operation can be a set of successive operations, or can consist of the standby of the processor without actual operation.

By "metadata", we understand data relative to the displayed data: if it is a file, the metadata can encompass the date of its creation, the author, the type of displayed data (text file, image file, database file, . . . ). A particular displayed data can be of more than one type: a document can be a text file, but it can also be of the type "invoice" for instance; a document can be of the type "image" but it can be of the sub-type "landscape", "X-ray", "blue print". The metadata can also be the OS or the software that was used to generate a file. The metadata can contain the format (text, diagram, image, book, audio, video, mp4, jpeg, png, pdf, xml, email . . . ) and the properties of a document (number of colors, ppi . . . ). Although these examples are given for computer stored document, physical document also have similar metadata (serial number, ISBN, author, title, size, . . . ).

When the algorithm takes into consideration the metadata of the displayed data, the criteria of the metadata used in the algorithm can be an exact value (author=C. S. Lewis) or relative values (duration of the video>10 minutes).

The algorithm can take into consideration the context when/where the association is made. The context can be the location (GPS coordinate, kind of place: restaurant, shop, movie theatre, office). The context can also be defined by tracking the user activities (location visited, applications used or installed on the smartphone of the user of the token, search engine log file, etc.). The context can be related to the agenda of the user (professional meeting with pre-determined people, leisure activity, etc.).

The algorithm can also decide on the operation to be carried out based on pre-determined settings. The setting step can be performed by the user prior to using the token. The settings can comprise a workflow of operations. Since the log file contains the previous associations, the processor can know which step of the workflow has been reached in a process and can therefore perform the appropriate operation.

The operations that can be performed can be of any kind. For example, it can be a copy-paste (or part of it), between two displays or between two zones of the same display; a synchronization; a locking of the displayed data until a new association with the same token is done; the creation of an icon in the zone of the association; etc. A few examples are given in the detailed embodiments depicted below.

The operation performed can entail an alteration of the displayed data. The alteration can depend on the metadata. For instance, a post-it can be OCRed, a table can be transposed, a big file can be compressed, an URL can be shortened, etc.

Although this should be the exception and not the rule, it can happen that the algorithm determines that several possibilities of operation(s) could be carried out as a result of the analysis of the log file. In such a case, the user is prompted accordingly. The token can be provided with a button to be used to choose which one(s) of the operations should be performed. Alternatively, a gesture can be performed. The gesture can be detected by sensors or by the token itself (for instance, accelerometers). The gesture can be learned by the user, can be taught to the system, or can be a universally used gesture. For instance, if the operation relates to turning up the volume of an acoustic system, the gesture can be in relation with the rotation of a volume knob, for instance rotating a finger or the hand clockwise or counter-clockwise. Other body gestures are also possible. Alternatively or in combination, other human-computer-interfaces (mouse, keyboard, remote control, etc.) can complement the use of the token and in particular to select which of the prompted operations is to be performed. The gesture can be recognized and compared with reference gestures that are pre-recorded in the system.

The system according to the invention can be used in combination with a device with which the token can perform a second association. Device is to be understood in its widest meaning. The device can be a second display with similar or different properties than the (first, main) display. The device can be provided with second proximity sensors to assess the proximity of the token to one zone of the device. The second proximity sensors can be similar of, different of or can consist in the proximity sensors in relation with the display.

The device can comprise a recess to receive the token.

The device can be one of the Internet of Things (IoT). For instance, it can be a domestic tool or appliance (light, kitchen appliance, TV set, wearables, etc.) or a professional device, for example: loudspeaker, microphones, beamer or spot lights in a concert theatre; resources on a pallet on a construction site; pieces of furniture; art masterpieces; a vehicle; etc.

The device can also be a smartphone, a printer, a touchscreen, a tangible table.

The system of the invention is not limited to one display and one device. Further displays and devices can be used in cascade. The successive associations with successive zones of successive display(s) or device(s) can be advantageous to realize a more complex operation.

For instance, in combination with the gesture analysis described above, a gesture—for instance a circle performed by the hand of the user holding the token—can be done in the vicinity of a zone of a display comprising a number. Then a second similar or different gesture, for instance a cross, can be performed in the vicinity of a second zone of the same or a second display, where a number is displayed. Finally a third gesture (for instance a "Z" symbolizing the symbol "=") can be performed in a third zone of the same, the second or a third display. The algorithm performed by the processor would calculate the sum of the two numbers and display the result in the third zone. Various amount of successive action in cascade can be done and various operations can be performed. To that end, the log file or another external storage medium can comprise the reference gesture and can record the successive gestures performed by the user.

The second association can be performed before the first association. This allows, for instance, to first associate the token with the device and then by associating the token with the display, the zone of the association on the display can be affected to take control over the device.

If the display is a smartphone, the association can create an icon that represents the device and that will, when touched, open an application in relation to the device. The application can be automatically downloaded from the website of the manufacturer of the device.

If the display is a mixing table, the successive second associations with microphones and the successive (first) association with zones of the mixing table will allocate each of the zone to a particular microphone.

The device and the display may be connected to the same network (LAN, WLAN, etc.) or through a cloud.

In an exemplary embodiment, some of the following features, alone or in combination, could be used: the token can be used to capture one or more elements of a digital model (BIM) displayed on a zone of a display. Then, the token can be positioned on a timeline displayed on a tangible table to assist the scheduling of the tasks to be accomplished for a construction site. A combined use of several tokens makes it possible to define a succession of steps so that a scheduling of a construction site can be built. Associations between a BIM element and the scheduled date of beginning of the task related to this element can be made (e.g. a window of a building, a wall, etc.). Furthermore, a token provided with a display would allow to show the name/ID of the element(s) that has been captured. An ergonomic handling of the elements on various workflow charts will therefore be possible. A menu on the tangible table can be opened so that the duration of the task associated to the element(s) can be set. LEDs can be provided on the token to associate the status of the task to the current status (e.g. waiting, work in progress, finish, etc.). Also, by acting on the optional button on the token, appropriate documents associated with the captured element(s) can be shown on the display of the token, the tangible table or the BIM model.

This example shows that the invention can also be formulated as follows:

A system comprising at least one display displaying a digital model and provided with at least one zone corresponding to one or more elements of the digital model; at least one token; a proximity sensor for detecting the proximity of a token to one of the zones of the display; appropriate processor and memory to associate the token with the one or more elements of the zone the token has been brought into proximity with; at least a second display, in various instances, is a tangible table showing a timeline; direct or indirect communication means between the displays; the system being configured such that the one or more elements associated with the token can be processed on the second display.

Each part of such a system can have features as discussed above or below: the token can have a detectable ID, a display and/or LEDs. The token can exchange data with one or both of the displays.

DRAWINGS

Some examples of embodiments of the present invention will be clearer in view of the appending figures.

DETAILED DESCRIPTION

Figure 1:
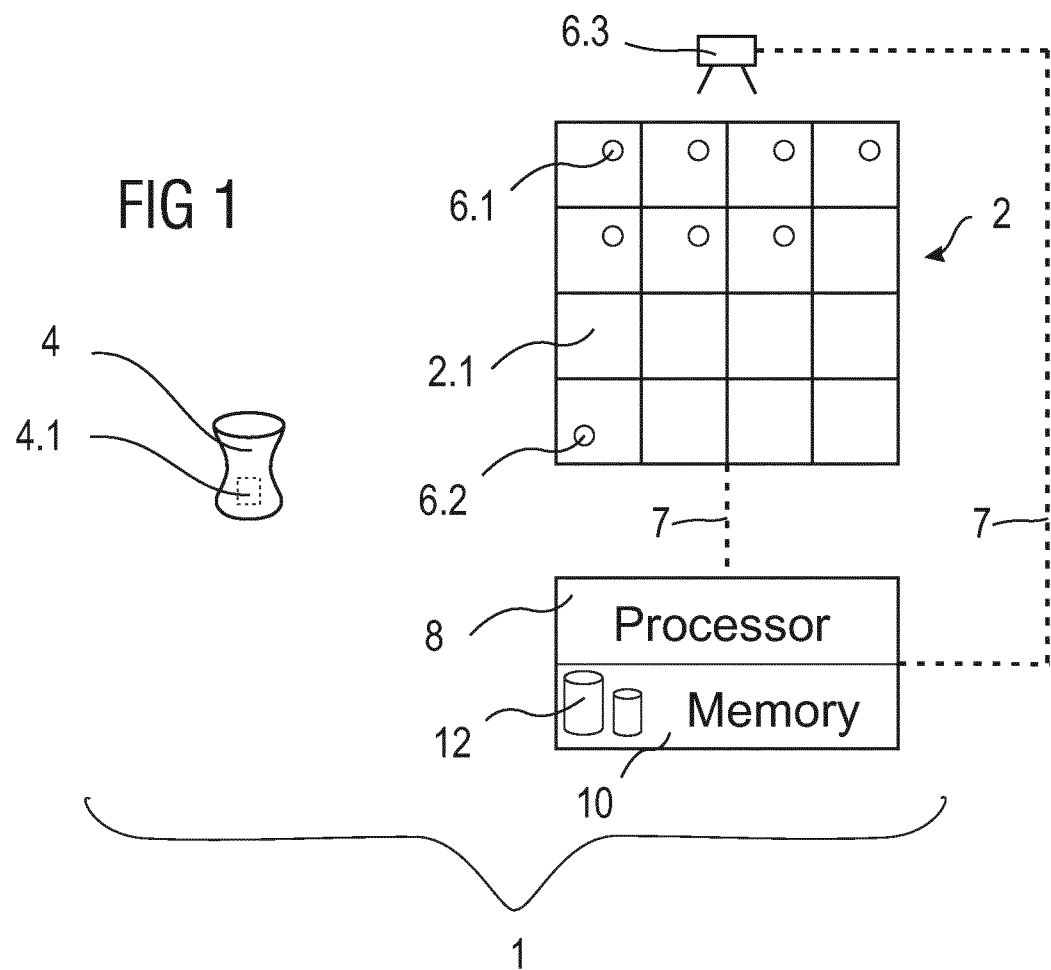
FIG. 1 shows a first exemplary embodiment of the system in accordance with various embodiments of the invention.

FIG. 1 shows a first exemplary embodiment of the invention. The system 1 comprises a display 2 and at least one token 4. The display 2 comprises at least one zone 2.1. In this particular example, there are sixteen zones 2.1. The system also comprises proximity sensors 6.1, 6.2, 6.3 to detect the proximity of the token 4 to one zone 2.1 of the display 2. These can be integrated in the display 6.1, 6.2. One sensor 6.1 can be provided for each zone or a sensor 6.2 can be provided to detect the proximity of the sensor 4 with respect to several zones 2.1.

The token 4 is a simple and small object. It comprises an ID, for instance an RFID tag 4.1. The ID of the token can also be its color, texture, shape, etc.

The proximity sensors 6.1, 6.2, 6.3 can identify the ID of the token.

The system comprises a processor 8 which is connected to the proximity sensors 6.1, 6.2 or 6.3 via a direct or indirect connection 7. The processor 8 communicates with a memory 10 to update a log file 12 when an association occurs, i.e. when the proximity sensor detects that the token 4 is in the vicinity of a zone 2.1.

The memory 10 can contain several log files 12, each of them being for example dedicated to one token 4 of the system.

The processor 8 carries out an algorithm (see FIG. 6) to determine an operation that it has to perform, based on the content of the log file(s) 12.

Figure 2:
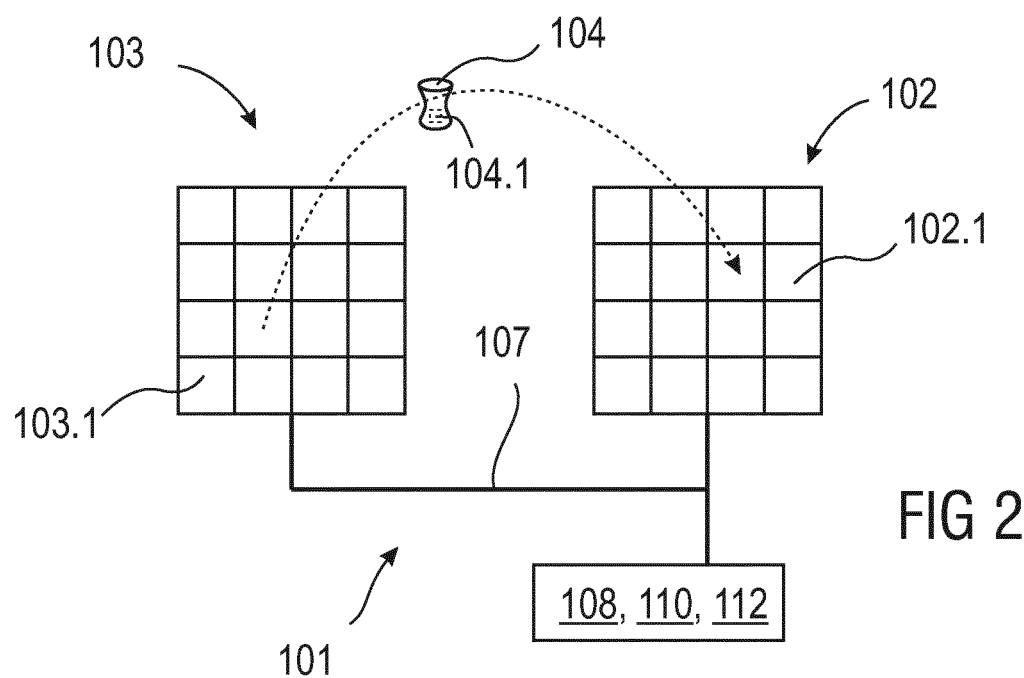
FIG. 2 shows a second exemplary embodiment of the system in accordance with various embodiments of the invention.

FIG. 2 represents a second exemplary embodiment of the invention. The referral numbers are incremented of 100 with respect to the first exemplary embodiment.

The system 101 comprises a display 102 having zones 102.1. The system 101 comprises further a device 103 in the form of a second display 103 with zones 103.1. Second proximity sensors (not shown) are provided to detect the proximity of the token 104 to a zone 103.1 of the second display 103.

Both displays 102, 103 or the proximity sensors in relation with both displays (not shown) are connected through a connection 107 to the processor 108 and memory 110 that contains log files 112. Although depicted as a common connection 107, the two displays may be independently connected to the processor 108 and memory 110.

A second association, registered upon detection of the proximity of the token 104 to a zone 103.1 of the second display 103 can be registered in the log file 112.

The second association can happen before the association of the token 104 with the first display 102.

In this embodiment, for example, a copy-paste operation can be achieved between the second display 103 and the first display 102. The displayed data in the zone of the second display 103 paired with the token 104 during the second association can be copied and pasted in the zone of the first display 102 paired with the token 104 during the first association. It can therefore be, that the data to be copied are at no time held in the token 104.

Figure 3:
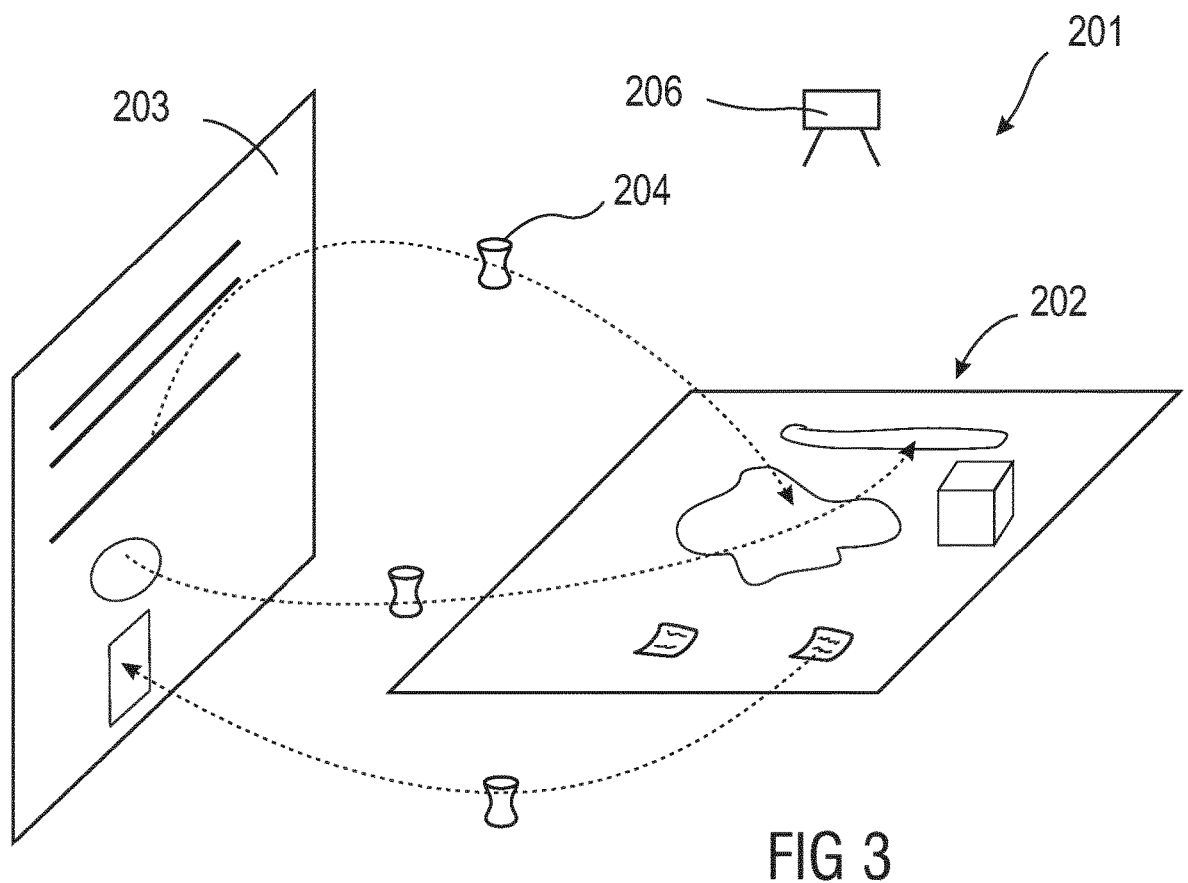
FIG. 3 shows a third exemplary embodiment of the system in accordance with various embodiments of the invention.

FIG. 3 illustrates a third exemplary embodiment of the system 201 according to the invention. The referral numbers are incremented of 100 with respect to the second exemplary embodiment.

A first display 202 comprises zones. The first display can be a tangible table. The zones can be predetermined or can evolve with time, for instance, a curved zone delimited by the shape of a tangible object can move when the tangible object moves on the tangible table. The proximity sensor 206 can detect the proximity of a token 204 to the first display 202. Similar proximity sensor (not shown) can be provided for a second display 203. The second display 203 can be a regular white board or electronic whiteboard. Data can be transferred from one of the display 202, 203 to the other one.

In this embodiment, for example, the tangible table can contain a geographical representation of a construction site. The white board can contain time-based information. By performing successive association, the user can synchronize the time-based information onto the geographical location in relation with such a piece of information. For example, an activity or a resource can be manipulated in this embodiment.

The first display 202 can contain physical element (objects, post-it, etc.) which can represent a zone, part of a zone or a plurality of zones, of the display. An association can be detected between the token 204 and such objects and a further association on the second display 203 can report properties of this object on the second display 203.

The transfer of information can be performed in conjunction with an alteration of the data. For example, an appointment in an agenda (Lotus/Outlook) can be associated to the token and then the token can be associated with a map. The resulting operation can be the specification in Lotus/Outlook of the location of the appointment as defined on the zone of the map that has been associated to the token. Vice-versa, the map can be updated with details of the appointment (participants, date and time, etc.).

Figure 4:
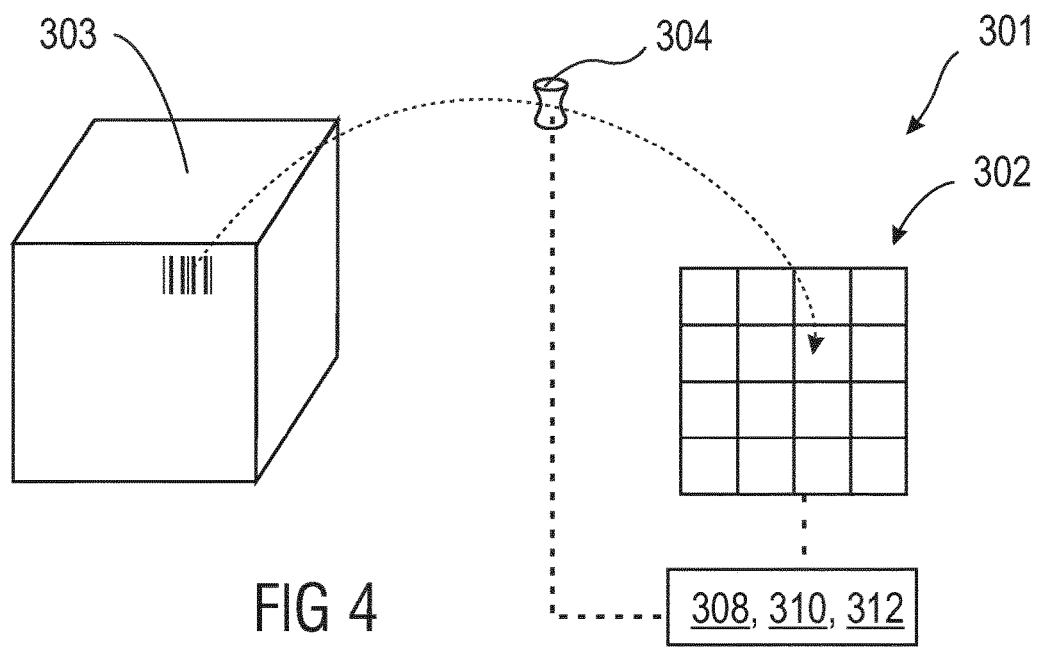
FIG. 4 shows a fourth exemplary embodiment of the system in accordance with various embodiments of the invention.

FIG. 4 illustrates a fourth exemplary embodiment of the system 301 according to the invention. The referral numbers are incremented of 100 with respect to the third exemplary embodiment.

In this embodiment, the token 304 is provided with sensors to detect properties of a device 303. These properties can be of any kind (shape, form, color, ID, barcode, QRcode, etc.).

The token is then associated with a zone of the display 302. The display may contain a digital model. By associating the token 304 with a zone of the display, the digital model can be updated with a virtual image of the object 303. To this end, the token 304 can be provided with communication means to communicate acquired data of the object 303 to the processor 308.

For example, the digital model can be a BIM, the device 303 can be a pallet of material to be handled on a construction site. The operation performed by the processor can be the reservation of the material to one purpose or one user.

Figure 5:
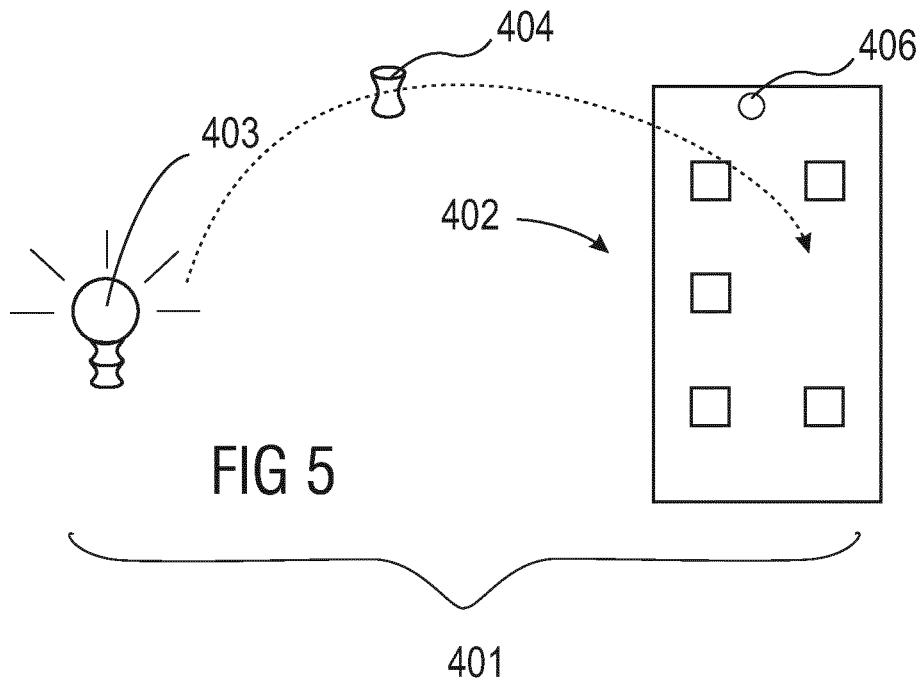
FIG. 5 shows a fifth exemplary embodiment of the system in accordance with various embodiments of the invention.

FIG. 5 illustrates a fifth exemplary embodiment of the system 401 according to the invention. The referral numbers are incremented of 100 with respect to the fourth exemplary embodiment.

The system 401 according to this fifth exemplary embodiment comprises a display 402 with zones. In this example, the display 402 is the touchscreen of a smartphone. Sensors of the smartphone like the camera, microphone, IR-based proximity sensor, Bluetooth, magnetometer, accelerometer or the touchscreen can play the role of the proximity sensor 406. Alternatively, an external sensor can be provided.

The system 401 comprises a device 403 of the Internet of Things. In this example, the device is a light dimmer. The light dimmer is connected to the smartphone 402 via any protocol, such as LAN, WLAN, cloud, etc.

The device 403 or the token 404 is equipped with means for detecting the proximity of the token 404 to the device 403. Such a proximity triggers an association.

Then the token 404 is associated with a zone of the display 402. In this example, the processor can create an icon on the smartphone in relation to the device 403. The icon can represent the device 403 and/or can be linked to an application aiming at controlling the device 403.

It is to be noted that the illustrative embodiments of FIGS. 1 to 5 are only showing a few examples of the possibilities of the system of the present invention.

Another example can be related to payment of an order. Some restaurants are equipped with touchscreen to enable the customer to select his meal. By using a token with a Credit Card RFID chip as ID of the token, the customer can select its meal on the touchscreen and then approach a zone displaying a credit card to directly pay his bill without having to carry out the cumbersome operation of payment.

A further example can be to put the token in the vicinity of electronic components of a personal computer and then to associate the token to a zone of the computer monitor to build a digital model of the hardware and to control each of the peripherals. Thus, for instance, the token can be put in the vicinity of the graphics card and then it can be associated with a zone of the computer monitor. An icon or any other suitable application will be created in this zone to control the settings of the graphics card. A message relative to the functioning of the graphics card (error message, speed of the cooling fan, etc.) can appear in the allocated zone. This example can be done with any device instead of a personal computer (server, printer, fridge, . . . ) in combination with any monitor showing a digital model of the device.

All these embodiments serve only illustrative purposes of the present invention and the person skilled in the art is able to extract teachings from each of these embodiments and to combine them to form a further embodiment that would suit particular needs and answer particular problems. Such a resulting embodiment would not depart from the scope of the invention as defined in the appended claims.

Figure 6:
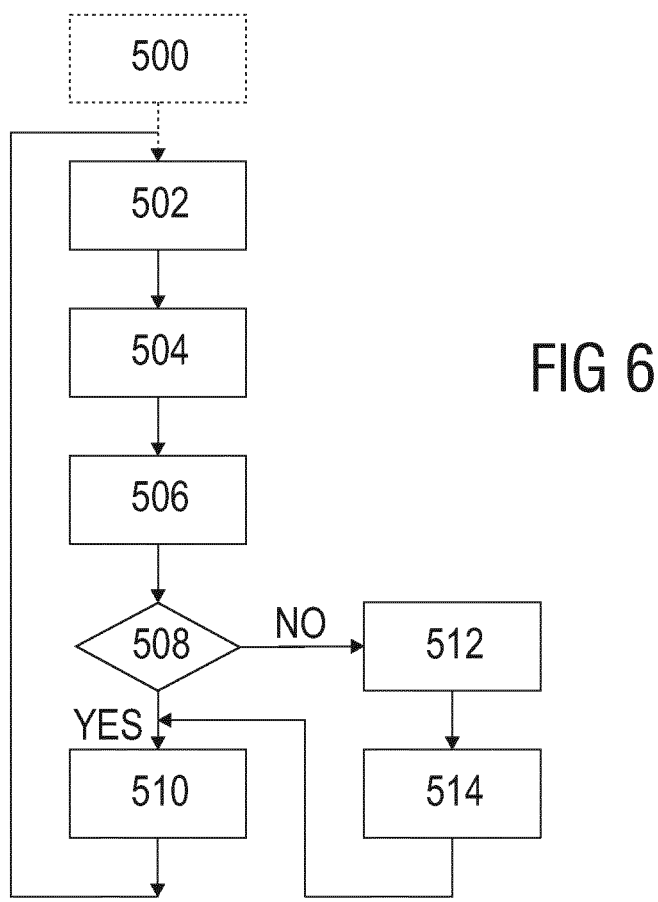
FIG. 6 shows an exemplary flowchart in accordance with various embodiments of the invention.

FIG. 6 exemplarily illustrates a process in relation to the present invention.

The process comprises a first optional step of configuration or settings, where the user can define settings of the algorithm.

Step 502 is the occurrence of an association: the proximity of a token to a zone of a display is detected.

In step 504, the processor registers this association and updates the log file accordingly.

In step 506, the processor runs the algorithm to determine which operation(s), if any, must be done, according to the content of the (now updated) log file.

Once the algorithm has been run, the processor may have identified one single possibility of operation(s), if any, to be carried out. Step 508 estimates whether one single possibility of operation(s) has been identified. If such is the case (path of the flowchart "YES"), the processor performs the operation(s) in step 510. Otherwise, i.e. if more than one possibility of operation(s) has been identified (path "NO"), the flowchart continues as follows: the user is prompted, in step 512 to choose which one(s) of the possible operations should be performed.

The user inputs his choice in step 514 and then the processor performs in step 510 the desired operation(s).

If no setting is made in step 500, the user may be prompted several times in several successive loops of the flowchart, to choose which operation is to be performed, until a criterion is reached or a threshold of odds is passed, such that the algorithm integrates previous choices of the user. For instance, in a given situation, if the user has chosen 4 times in a row a specific operation, the algorithm can be adapted such that in future similar context, the same operation is performed without prompting the user. This way, the algorithm can be fed by the practice of the user.

The invention claimed is:

1. A system, said system comprising:
at least one display provided with at least one zone;
at least one token provided with an ID;
a proximity sensor for detecting the proximity of a token to one of the zones of the at least one display and for detecting the ID of the token;
a memory;
a processor programmed to register in the memory an association upon the detection of the proximity of the token to the zone, the association being logged as a set of data comprising the data of which a representation is made on the zone of the at least one display in the proximity of which the token has been brought at the moment of the detection and the ID of the token;
a device provided with at least one zone; and
a second proximity sensor for detecting the proximity of a token to one of the zones of the device and for detecting the ID of the token,
wherein the processor is programmed to register in the memory a second association upon the detection of the proximity of the token to a zone of the device, and
wherein the processor is programmed to update a log file with the logged association and with the second association, and to perform an operation, wherein the operation performed depends on the content of the log file.

2. The system according to claim 1, wherein the operation depends further on the metadata of the displayed data.

3. The system according to claim 1, wherein the operation depends further on a setting or personalization procedure.

4. The system according to claim 1, wherein the operation depends further on a gesture made by the user hand holding the token, the gesture being detected by the proximity sensor or a further gesture sensor.

5. The system according to claim 1, wherein the operation depends further on the context, the context comprising at least one of geographical position, time, date and situational context during which the association occurs.

6. The system according to claim 1, wherein the token is allocated to a user and the operation depends further on authorizations given to the user.

7. The system according to claim 1, wherein the second association occurs before the first association.

8. The system according to claim 1, wherein the device is a second display.

9. The system according to claim 8, wherein at least one of the displays and the second display is a monitor or a touchscreen, and at least one of the proximity sensors are integrated into the display.

10. The system according to claim 8, wherein at least one of the displays and the second display are a physical display, the physical display being written information on a support, and the proximity sensor comprises one or more camera connected to the processor.

11. The system according to claim 8, wherein at least one of the displays and the second display are tangible tables.

12. The system according to claim 1, wherein the device is a device of the Internet of Things.

13. The system according to claim 1, wherein the operation performed is one of at least part of a copy-paste operation, or at least part of a synchronisation operation of the data displayed.

14. The system according to claim 13,
wherein the operation performed consists in copying the displayed data and pasting the data, one of in or on the device.

15. The system according to claim 1, wherein the operation performed is a locking of the displayed data.

16. The system according to claim 1, wherein the log file is dedicated to at least one of:
one token;
one zone of the display;
one display; and
one displayed data.

17. The system according to claim 1, wherein the log file further comprises the indication of at least one of:
date or time; and
geographical localisation of at least one of when and where the association occurred.

18. The system according to claim 1, wherein the proximity to a zone of the display is detected when the proximity sensor detects that the distance between the token and a zone of the display is below a pre-determined threshold.

19. The system according to claim 1,
wherein the token can be inserted in a recess of the device.

* * * * *